April 29, 1930.  H. F. THOMPSON  1,756,527
POWER SAW
Filed May 3, 1926   3 Sheets-Sheet 1
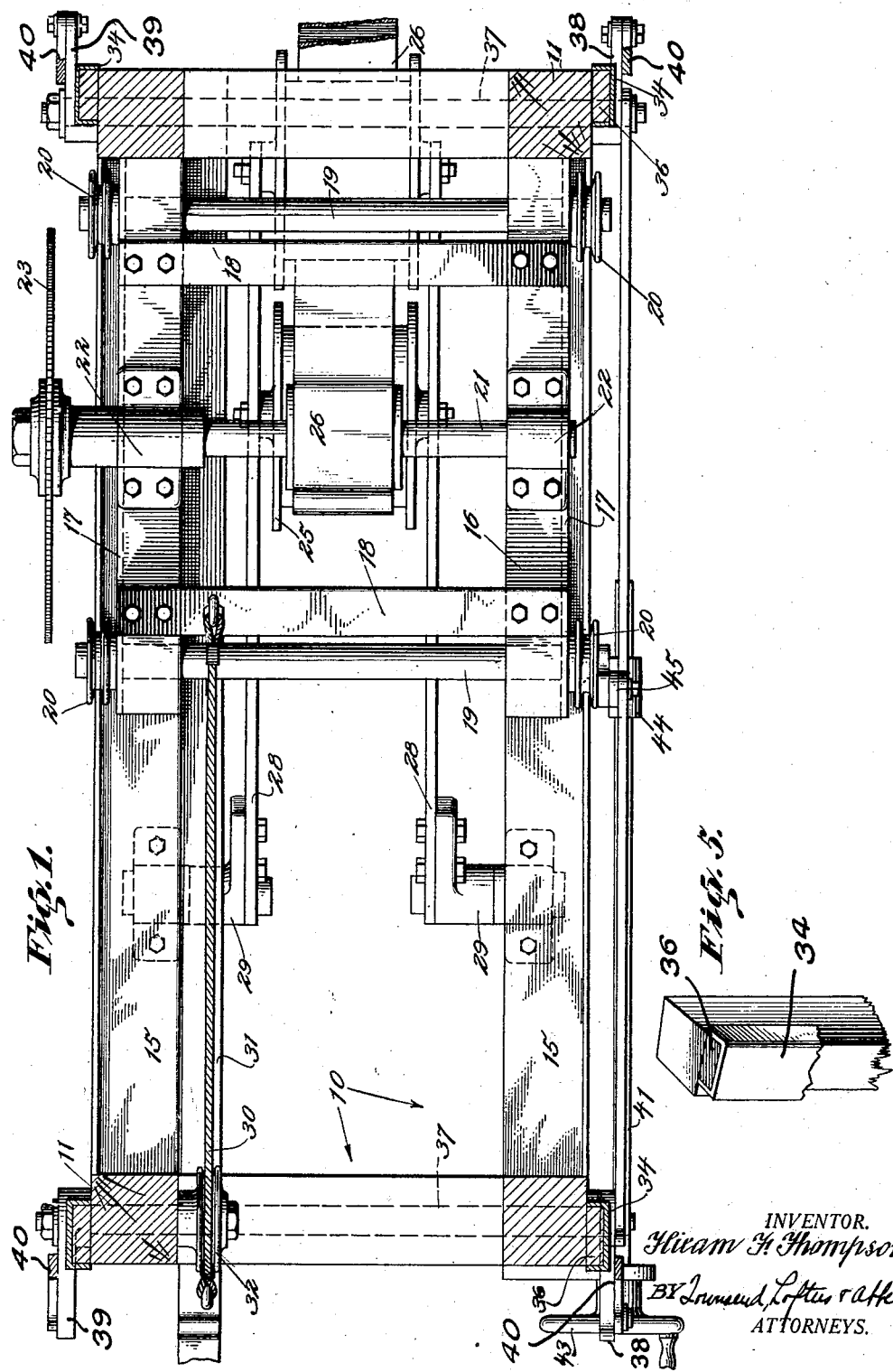
INVENTOR.
Hiram F. Thompson
BY Townsend, Loftus & Hackett
ATTORNEYS.

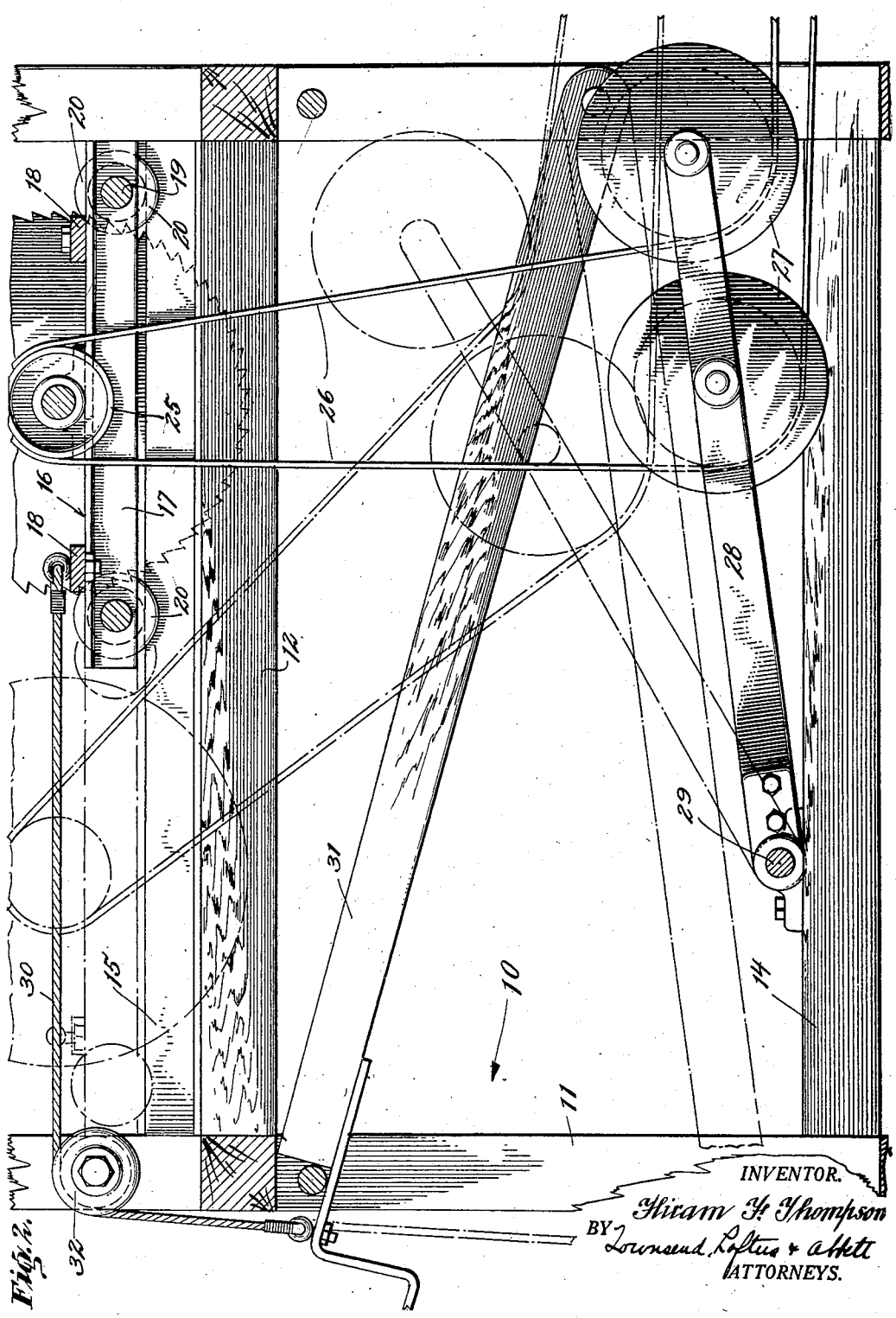

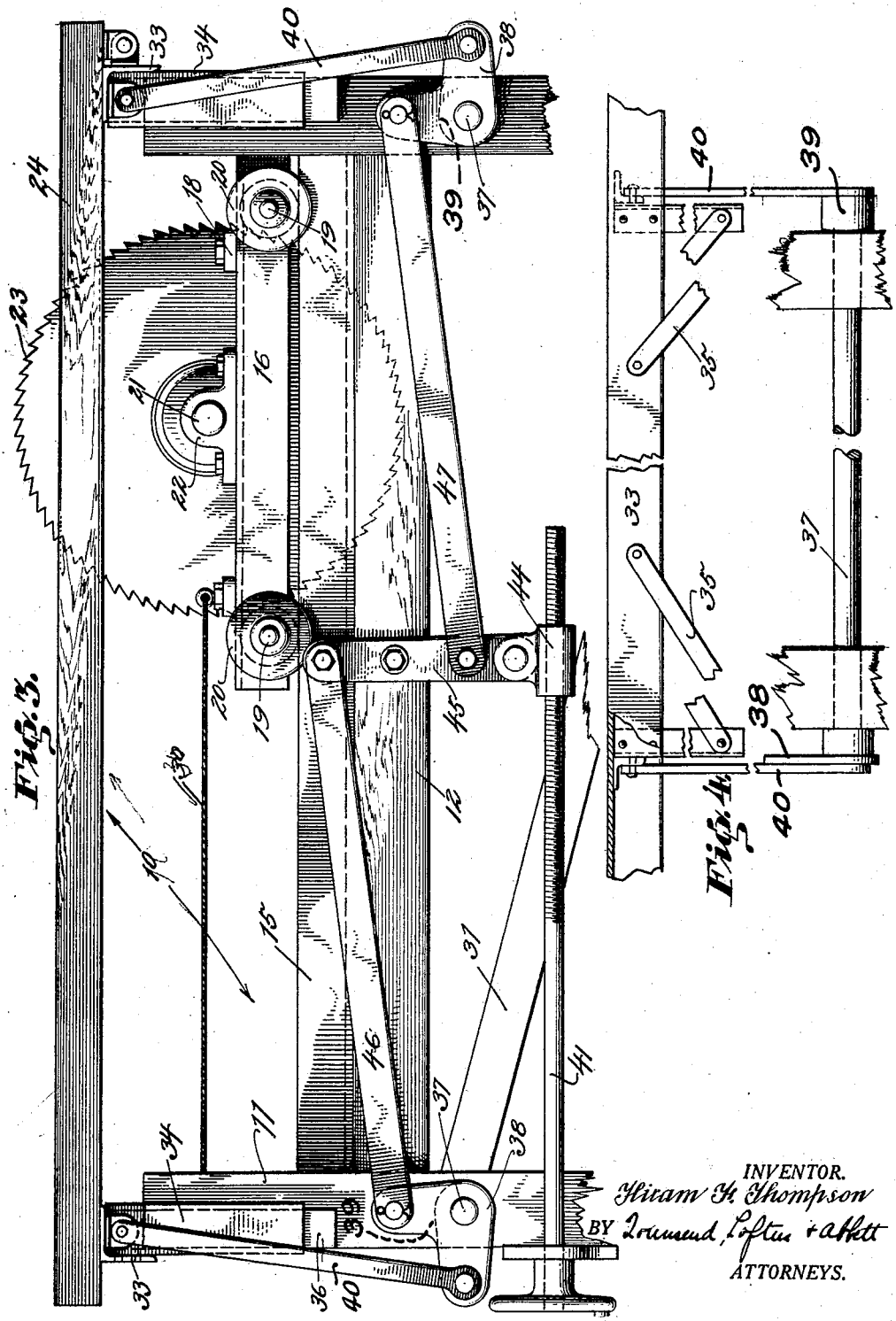

Patented Apr. 29, 1930

1,756,527

UNITED STATES PATENT OFFICE

HIRAM F. THOMPSON, OF OAKLAND, CALIFORNIA

POWER SAW

Application filed May 3, 1926. Serial No. 106,217.

This invention relates to power wood saws and particularly pertains to portable machines of this character.

It is the principal object of the present invention to generally improve machines of the character referred to whereby to provide an improved portable power wood saw of comparatively simple and inexpensive construction wherein the saw may be advanced through the work by a foot operating mechanism and returned to starting position automatically, and wherein the work support may be easily and quickly vertically adjusted relative to the saw.

In carrying out this object I provide a frame which is portable and upon which a saw carriage is reciprocably mounted. The saw carried by the carriage may be advanced through the work by a foot operated lever and is capable of being automatically returned to starting position by idler pulleys which are so disposed and arranged that they will return the carriage through the medium of the driving belt of the device. The table top for supporting the work and through which the saw projects is capable of being vertically adjusted relative to the saw by means of a simple and positively operating mechanism carried by the main frame in a position convenient to the operator of the device.

One form which the invention may assume is exemplified in the following description and illustrated by way of example in the accompanying drawings, in which:

Fig. 1 is a view in plan, with the table top removed, disclosing a portable power saw embodying the preferred form of the invention.

Fig. 2 is a longitudinal vertical section through the device disclosing the arrangement of certain of the operating parts.

Fig. 3 is a fragmentary view in side elevation of the machine disclosing the mechanism by which the table top may be vertically adjusted relative to the saw.

Fig. 4 is a fragmentary view in end elevation disclosing the arrangement of the mechanism referred to in the preceding figure.

Fig. 5 is a fragmentary view in perspective disclosing one of the guide shoes and the manner in which it engages the guide rails on the frame for guiding the table top in its vertical movement.

Referring more particularly to the accompanying drawings I have illustrated a portable power wood saw particularly adapted for use when erecting buildings, as the saw may be transported from place to place and driven either by an electric motor or from a pulley attached to an automobile or tractor.

The apparatus is formed with a rigid frame 10 having upright members 11 and upper and lower horizontal members 12 and 14. It is intended that the sides of the frame be enclosed so as to completely encase certain of the mechanism of the machine. Arranged longitudinally on the upper frame members 11 are spaced rails 15 which form a trackway upon which a saw carriage 16 is mounted. This carriage is formed of side frame members 17 rigidly connected at their top by transverse bars 18. At its opposite ends of the frame of the saw carriage is fitted with transverse axles 19, at the ends of which are mounted wheels 20, which are circumferentially grooved and are adapted to ride upon the rails so that the carriage may be reciprocated longitudinally of the main frame of the machine.

Extending transversely of the saw carriage and approximately centrally thereof is a saw drive shaft 21 which is mounted in bearings 22 carried by the saw carriage. At one end of the drive shaft a circular saw 23 is fixed. This saw is arranged to extend through a slot formed in the saw table 24 mounted horizontally over the top of the main frame.

To drive the saw, the drive shaft is fitted with a pulley 25 over which a belt 26 is arranged. This belt may extend to and engage a suitable driving pulley either directly mounted on a driving motor or otherwise arranged so that it may be driven. As this drive pulley forms no particular part of the present invention, it is not illustrated.

For the purpose of permitting the carriage 16 to reciprocate while the saw is being driven and also for returning the carriage to neutral position, I have provided a pair of pulleys 27 which engage the belt. These pulleys are carried by rearwardly extending pivotal arms 28 pivotally connected at their forward ends to the main frame of the device as at 29.

Reference being had to Fig. 2, it will be noted that the arms carrying the pulleys are arranged longitudinally of the frame and extend rearwardly, the pulleys being carried at the free ends of the arms. As the pulleys bear downwardly on the belt, forward movement of the carriage is resisted by the weight of the pulleys. As the distance between the drive shaft of the saw and the driving pulley will increase when the carriage is moved forwardly, the belt will tend to straighten, thus raising the pulleys and swinging the arms upwardly about their pivotal point. This will dispose the weight of the pulleys on the belt. After reaching the forward end of its travel the carriage is released and the pulleys are of sufficient weight to return the carriage to its starting position. The carriage is moved forwardly by means of a cable 30 connected at one end to the carriage and at the other end to a vertical swinging lever 31. This lever 31 is pivoted at its rearward end to the frame, its forward end being connected to the cable which is led over an idler sheave 32. The lever is fitted at its forward end with a foot pedal so that it may be depressed to draw the saw carriage forwardly of the frame. After the saw has been moved forwardly by means of the lever and the latter is released, the weight of the swinging pulleys is sufficient to automatically return the saw carriage to starting or neutral position, as described.

I have also provided means for vertically adjusting the position of the table top 24. Reference being had to Figs. 3, 4 and 5 it will be noticed that transversely extending bars 33 are arranged above the main frame, adjacent and parallel to its ends.

The table top 24 is hinged to one of these bars and is supported by the bars in correct position above the frame. Adjacent their outer extremities, the bars 33 are fitted with rigid guide shoes 34 which extend vertically. These guide shoes are riveted or otherwise secured to the transverse bars at their upper ends and their lower ends are suitably braced by braces 35. These guide shoes 34 slidably engage short guide rails 36 secured at the upper ends of the four vertical members 11. It is apparent therefore that these guide members permit the top 24 to be vertically moved relative to the main frame and saw while being held in correct relation thereto.

To vertically move the top I have provided a pair of transverse shafts 37 which are arranged at opposite ends of the main frame and rotatably mounted at their ends in the vertical posts 11 of the frame. At one side of the frame, the shafts 37 are each fitted with a bell crank lever 38. At the other side of the frame each shaft 37 is fitted with a crank arm 39 which agrees in throw to the horizontal arms of the bell crank levers 38. The crank arms 39 and the horizontal arms of the bell cranks 38 extend longitudinally of the frame in opposite directions and their outer ends are connected to the transverse bars 33 of the table top by connecting rods 40. The crank arms 39 and the bell crank levers 38 are all secured on the shafts 37 so that when the shafts rotate in unison, the table top 24 will be raised or lowered relative to the saw as the case may be.

To rotate the shafts 37 in unison an equal amount when desiring to adjust the height of the table, I have provided an adjusting shaft 41 arranged at the same side of the frame as the bell crank levers 38. This adjusting shaft 41 is supported at the forward end of the frame by a bearing, at this end the shaft is fitted with a hand wheel 43 by means of which it may be rotated. The adjusting shaft 41 is threaded and engages a feed nut 44 which is pivotally connected to the lower end of a centrally pivoted lever 45. This pivotal lever is arranged midway between the shafts 37 and swings in a plane parallel to that of the bell crank levers 38. The upper end of the pivotal lever 45 is connected by a link 46 to the vertical arm of the forward bell crank lever 38. The lower end of the lever 45 is connected by a link 47 to the vertical arm of the rear bell crank lever 38.

The distance between the pivotal point of the lever 45 and the point where the links 46 and 47 connect thereto is equal so that equal amounts of swinging movement will be imparted to the bell crank levers 38 when the adjusting shaft 41 is operated to move the lever 45.

It will be also noted that the bell crank levers 38 will be swung in opposite directions due to their connection in the lever 45. This is necessary inasmuch as the horizontal arms of the bell cranks extend in opposite directions.

It is obvious from Fig. 3 that when the shaft 41 is rotated by means of the hand wheel 43 that the feed nut 44 will be moved relatively to the pivotal point of the lever 45, thus causing the latter to swing in either one direction or the other. This swinging movement of the lever 45 will impart swinging movement to the bell cranks 38, swinging the latter in opposite directions, thus raising or lowering the table top 24.

In operation of the device, assuming that the saw carriage is in the position shown in Figs. 1 and 2, the work is placed on the table top forwardly of the saw. The forward end of the lever 31 may then be depressed to move the saw carriage forwardly as desired. When desiring to return the saw to normal position, it is only necessary to release the lever 31 so that the weight of the pulleys 27 bearing on the belt 26 will cause the saw carriage to return to its starting position. It is obvious that the belt 26 may be driven by any suitable driving pulley.

When it is desired to adjust the vertical position of the table top 4, it is only necessary to revolve the shaft 41 transmitting vertical movement to the connecting rods 40 through the medium of the bell crank levers 38 and the crank arms 39 which are secured on the shafts 37. In this manner the amount which the saw blade projects from the upper surface of the table top may be regulated.

The saw table here disclosed is obviously very simple and compact in construction, and is self-contained, it being only necessary to connect the belt 26 to a suitable driving medium when desiring to operate the saw.

One of the features of the present device is that all of its operations are absolutely positive and are accomplished through the medium of simple mechanism.

In use, the saw may be transported from place to place without any difficulty as it is light and compact, thus providing a very efficient apparatus for carpenters when constructing large or small buildings.

While I have shown the preferred form of my invention it is to be understood that various changes in its construction may be made without departing from the spirit of the invention as defined in the appended claims.

Having thus described my invention, what I claim and desire to secure by Letters Patent is:

1. A saw table comprising a portable main frame, a table top supported by the frame, transverse members arranged adjacent the ends of the frame and upon which said table top rests, a hinge connection between the table top and one of said transverse members, guide means associated with said transverse members and said main frame whereby the former may be adjusted vertically relative to the saw, and operative means for vertically adjusting said transverse members in unison, said means comprising shafts arranged transversely of the frame, crank arms on said shafts, connecting rods connecting said crank arms to said transverse members, a screw shaft carried by the frame, a centrally pivoted lever adapted to be operated by said screw shaft, a connection between said lever and eccentric points on said shafts whereby turning movement of said screw shaft will actuate the lever and impart rotation to said shafts.

2. A saw table comprising a portable main frame, a table top supported by the frame, transverse members arranged adjacent the ends of the frame and upon which said table top rests, a hinge connection between the table top and one of said transverse members, guide means associated with said transverse members and said main frame whereby the former may be adjusted vertically relative to the saw, and operative means for vertically adjusting said transverse members in unison, said means comprising shafts extending transversely of the frame at the opposite ends thereof, bell crank levers at one end of each shaft, a crank arm at the other end of each shaft, connecting rods connecting the bell crank levers to said transverse members, connecting rods connecting the crank arms to the transverse members whereby rotation of said shafts will impart vertical movement to said transverse members, a centrally pivoted lever carried by the frame intermediate said shafts, links connecting the bell cranks to opposite ends of said lever whereby swinging movement of the lever will impart swinging movement to the bell cranks and consequently the shafts in unison, a feed nut pivotally connected to one end of said lever, a screw shaft carried by the frame and engaging said feed nut whereby rotation of the screw shaft will cause swinging movement of said lever and consequently impart vertical movement to said table top through the medium of said shafts and connecting rods.

HIRAM F. THOMPSON.